United States Patent [19]

Ballweg

[11] Patent Number: 4,792,966
[45] Date of Patent: Dec. 20, 1988

[54] ARRANGEMENT FOR SYNCHRONIZING A BYTE CLOCK DERIVED FROM A DATA BIT STREAM WITH A BYTE-ORIENTED PROCESSING CLOCK OF A TERMINAL EQUIPMENT

[75] Inventor: Adolf Ballweg, Germering, Fed. Rep. of Germany

[73] Assignee: Siemens Aktiengesellschaft, Berlin and Munich, Fed. Rep. of Germany

[21] Appl. No.: 93,596

[22] Filed: Sep. 8, 1987

[30] Foreign Application Priority Data

Sep. 26, 1986 [DE] Fed. Rep. of Germany ....... 3632842

[51] Int. Cl.⁴ ............................ H04L 7/00; H04J 3/06
[52] U.S. Cl. .................................... 375/112; 375/117; 370/102
[58] Field of Search .................. 375/112, 114, 117; 370/100, 102; 371/42, 46, 47

[56] References Cited

U.S. PATENT DOCUMENTS

| 3,983,325 | 9/1976 | Ollinger et al. ............... 375/117 |
| 4,101,732 | 7/1978 | Suzuki ............................ 375/117 X |
| 4,674,088 | 6/1987 | Grover ............................ 370/102 X |

FOREIGN PATENT DOCUMENTS 123261 7/1983 Japan ................................. 375/117

OTHER PUBLICATIONS

"FDDI Physical Layer Protocol (PHY)" Proposed Draft for Standards, Computer & Business Equipment Manufactures Association, Aug. 22, 1986.

Primary Examiner—A. D. Pellinen
Assistant Examiner—Derek S. Jennings
Attorney, Agent, or Firm—Hill, Van Santen, Steadman & Simpson

[57] ABSTRACT

In a terminal equipment connected to a packet-oriented, ring-shaped network, a comparator identifies the beginning and the presence of a start of packet information after a series-to-parallel conversion of the data bit stream, whereby filler information are transmitted between the packets. With the recognition of the beginning of the start of packet information, a counter arranged in a byte clock generator is arrested and is reset given the presence of the complete start of packet information so that an internal, current byte clock pulse is lengthened and, therefore, the packet byte clock is synchronized with the byte clock inherent in the terminal equipment.

3 Claims, 1 Drawing Sheet

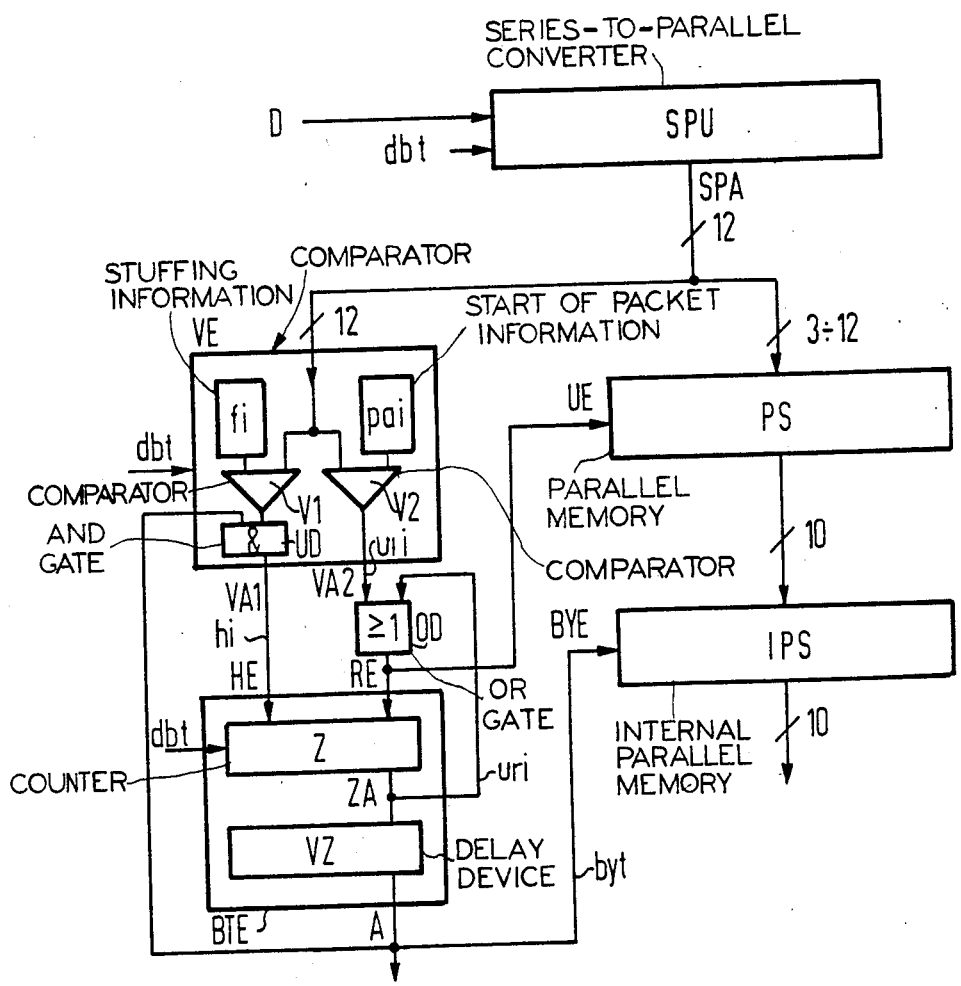

ARRANGEMENT FOR SYNCHRONIZING A BYTE CLOCK DERIVED FROM A DATA BIT STREAM WITH A BYTE-ORIENTED PROCESSING CLOCK OF A TERMINAL EQUIPMENT

BACKGROUND OF THE INVENTION

1. Field of the Invention

The present invention is related to an arrangement for deriving a byte clock from a serial, packet-oriented transmission data bit stream of a ring-shaped network comprising an extremely high data transmission rate, as well as for the synchronization of the derived byte clock with an internal processing clock of a terminal equipment connected to the ring-shaped network, whereby at least one filler information comprising the same binary information at all bit positions is inserted into the data stream between the data packets, each provided with a start of a data packet information, and the conversion of the serial data stream into a byte sequence adapted to the internal processing speed occurs in a series-to-parallel converter clocked by a data bit clock derived from the data bit stream.

2. Description of the Prior Art

The recognition and synchronization methods known in packet-oriented data transmission or, respectively, data multiplex technology, serve for the recognition of the beginning of a packet and, therefore, of the packet byte clock as well, and serve for the synchronization of this byte clock with an internal byte processing clock employed in a terminal equipment. The serial, packet-oriented transmitted data are thereby read into a series-to-parallel converter, usually realized by a shift register, and the data present at the parallel outputs of the shift register are investigated for the presences of a start packet bit information. At the time such a bit combination appears, the data are read from the shift register into a register integrated in terminal equipment and the byte or, respectively, processing clock inherent in the terminal equipment is adapted to the packet byte clock derived from the start of packet information. Due to the immediate synchronization of the two byte clocks, both shortenings and lengthenings of the byte clock pulses inherent in the terminal equipment occur. A shortening of the byte clock pulse inherent in the terminal equipment means a brief increase of the byte clock or, respectively, processing speed in the terminal equipment, whereby the admissible limit processing rate of the following circuit technology ios exceeded, particularly given extremely high data transmission rates in ring-shaped networks, even given a very fast circuit technology, and considerable disturbances are produced in the further processing, byte-clock clocked system components of the terminal equipment.

SUMMARY OF THE INVENTION

The object of the present invention is to provide an arrangement for deriving a byte clock from a serial packet-oriented transmitted data stream as well as for the synchronization of the derived byte clock with an internal processing clock of a terminal equipment connected to a ring-shaped network wherein no shortenings of the byte clock pulses or, respectively, processing clock pulses inherent in the terminal eqipment occur and short-duration disturbances during the byte clock synchronization are avoided.

The above object is achieved, according to the present invention, in a system of the type set forth above which is particularly characterized in that the parallel outputs of the series-to-parallel converter are connected to a comparator and to the inputs of a parallel memory, in that, first of all, after the identification of a bit information different from the filler information, a holding information is formed in the comparator and is supplied to a first comparator output via a first input and via the output of an AND gate and, secondly, after the recognition of the start of packet information, a transfer or, respectively, reset information is formed in the comparator and is fed to a second comparator output. The arrangement is further characterized in that a counter, arranged in the byte clock generator and clocked by the data bit clock, is arrested given the presence of the holding information supplied by way of the holding input, connected to the first comparator output and is reset given the presence of a transfer or, respectively, reset information supplied via an input and via the output of an OR gate and via a reset input. The arrangement is further characterized in that a transfer or, respectively, reset information output by the counter is fed to a delay device as well as to a second input of the OR gate and the output of the OR gate is additionally connected to the transfer input of the parallel memory. The transfer or, respectively, reset information can be delayed by a plurality of data bit clocks maximally corresponding to the byte length and the pulse-to-pause ratio is also variable in the delay device and proceeds to a byte input of an internal parallel memory as a byte-oriented, internal byte or, respectively, processing clock via an output. The date present in parallel are transferred into the parallel memory on the basis of the transfer or, respectively, reset information and are transferred into the internal parallel memory by way of the byte or, respectively, processing clock.

The advantage that may be obtained in practicing the present invention is particularly that a counter implemented in the byte clock generator is arrested after the recognition of an information different from the filler information, being arrested when the binary information of the byte or, respectively, processing clock at the output of the delay device corresponds to that binary information which the counter output comprises after the resetting, and whereby a shortening of the byte clock pulse inherent in the terminal equipment is impossible and influence of disturbances is prevented.

In accordance with a particular feature of the invention, the series-to-parallel converter has a plurality of registers arranged therein which corresponds to the plurality of bit positions of a data packet byte and, given the presence of an information corresponding to the filler information at the beginning of the start of packing information, the plurality of registers is increased by a plurality corresponding to the plurality of filler bits which are present up to the appearance of the first bit information different from the filler bits. Since the internationally-standardized start of packet information frequently comprise bit combinations whose initial information bits correspond to the filler information bit, an information different from the filler information and, therefore, a start of packet information can only be recognized after a plurality of data bits read into the registers of the series-to-parallel converter. However, in order to stop the counter implemented in the bit clock generator at the beginning of the start of packet information, the plurality of registers can be increased by a plurality corresponding to the plurality of filler bits which are present up to the appearance of the first bit of information different from the filler bits. What is assured with this technique is that the data present in parallel at the outputs of the series-to-parallel converter are not read on the basis of an internally generated byte clock pulse (the counter has not been stopped) at the time and are transferred in the parallel memory at which only a few information bits of the start of packet information have been read into the series-to-parallel converter.

BRIEF DESCRIPTION OF THE DRAWING

Other objects, features and advantages of the invention, its organization, construction and operation will be best understood from the following detailed description, taken in conjunction with the accompanying drawing, schematically illustrating the system components of a line or interface unit for the access of a terminal equipment to a data bit stream of a ring-shaped network communicating with high transmission rates, these components being necessary for an explanation of the invention.

DESCRIPTION OF THE PREFERRED EMBODIMENTS

Referring to the drawing, and as mentioned above, only those system components of a line or interface unit are shown which are necessary for an understanding of the invention, in particular for the access of a terminal equipment to a data bit stream D of a ring-shaped network communicating at high transmission rates (>50 Mbps). The transmission of the data D on the ring-shaped network occurs by way of byte-oriented data packets. The start of packet information pai, as well as the filler information fi communicated between the data packets is defined as follows in accordance, for example, with an ANSI-FDDI protocol: filler byte (10 bits) equal to 11111 11111 and the start of packet information being equal to 11001 10001. These packet-oriented data D are serially read into a series-to-parallel converter SPU which is clocked by a data bit clock dbt derived from the data bit stream. The series-to-parallel converter SPU, for example, is realized by a shift register comprising twelve storage locations S parallel outputs SPA. The two additional storage location of the register or, respectively, parallel outputs SPA exceeding a register bit length are required in order to recognize the first start of packet information pai different from the filler information fi early enough, according to the ANSI-FDDI protocol, the third bit having the binary "0" information. All twelve parallel outputs SPA are connected to a comparator VE and the parallel outputs SPA3 . . . SPA12 are connected to a parallel memory PS. In the comparator VE comprising a data bit clock V, the parallel outputs SPA are investigated in data bit clock fashion for the presence of a start of packet information pai different from the filler information fi, this investigation being for the presence of the first binary "0" at the first parallel output SPA. When such an information is present, then a holding information hi is formed by a comparator V1 in the comparator VE and this holding information hi is forwarded with appropriate connections to the holding input HE of a byte clock generator BTE by way of a first input and by way of the output of an AND gate UD and a first comparator output VA1. During the following 12 data bit clocks dbt, the parallel outputs SPA are investigated in the comparator VE for the presence of the start of packet information pai, in this case, for the binary starting combination 11001 10001. When the corresponding bit combination is present, then a transfer or, respectively, reset information uri is formed in a second comparator V2 in the comparator VE and is fed to a second comparator output VA2 connected to an input of a binary OR gate OD. The transfer or, respectively, reset information uri proceeds by way of the output of the OR gate OD both to a reset input RE of the byte clock generator BTE and to a transfer input UE of the parallel memory PS. The holding information hi and the reset information uri are fed to a holding input HE or, respectively, to a reset input RE of a counter Z which is clocked by the data bit clock dbt and which is implemented in the byte clock generator BTE. When no packet information pai are transmitted within the data bit stream D, then, after counting respectivey 10 data bit clocks dbt at the counter output ZA, a transfer or, respectively, reset information uri is output and is fed, first, to the second input of the OR gate OD via a corresponding connection and, secondly, to a delay device VZ by way of a corresponding connection.

If this transfer or, respectively, reset information uri communicated to the reset input RE, the counter Z is reset, i.e. all counter registers exhibit the same binary information, and, therefore, a counting event is restarted. The transfer or, respectively, reset information uri output at the counter output ZA is therefore present in a byte clock matched to 10 data bits and comprising a bit clock pulse length. In the following delay device VZ, this transfer or, respectively, reset information uri present in a byte-by-byte manner can be delayed by a maximum of 10 data bit clocks dbt, 4, 5 or 6 data bit clocks dbt are a meaningful delay time, and can be subsequently offered at the output A of the byte clock generator BTE as a byte or, respectively, processing clock byt inherent in the terminal equipment. Furthermore, the pulse-to-pause ratio of the byte or, respectively, processing clock byt can be varied in 10 steps (corresponding to the 10 bit clocks dbt per byte clock byt) on the basis of the delay device VZ. This byte or, respectively, processing clock byt inherent in the terminal equipment is fed by way of a corresponding connection to the second input of the AND gate UD of the comparator VE. The AND logic function assures that the counter Z is only arrested when the binary information of the byte or, respectively, processing clock byt at the output A of the delay device corresponds to that binary information which the counter output comprises after resetting and, therefore, a shortening of the byte or, respectively, processing pulse is impossible and the influence of disturbances is prevented. In order to also be able to transfer the information present in the parallel memory PS which are stored in bytes to the terminal equipment with a time delay, the outputs of the parallel memory PS are connected to a further, internal parallel memory IPS controlled by the byte or, respectively, processing clock byt inherent in the terminal equipment. When the presence of the first binary "0" of a start of packet byte is signalled at the first comparator ouput VA1 by transmitting the holding information hi, then the counting event in the counter Z is immediately stopped and the reset information state available at the counter output ZA is held. This state of the counter output ZA is retained or, respectively, a byte clock pulse inherent in the terminal equipment is lengthened until a transfer or, respectively, reset information uri is present at the comparator output VA2 after a predetermined plurality of data bit clocks and the counter Z is reset or, respectively, the byte clock pulse inherent in the terminal equipment is ended. As already set forth, the following byte clock pulses of the terminal equipment and matched to the start of packet information pai are generated by counting the data bit clock dbt and are fed to the further processing system components of the terminal equipment.

All system components of the arrangement for practicing the present invention can be realized with integrated emitter-coupled logic circuits of the fast 100K technology of Fairchild, with programmable logic arrays or with customer-tailored gate array circuit technology. By way of example, a respective possibility of realizing the individual system components with ECL or, respectively, PLA circuit technology set forth below and includes

| | |
|---|---|
| Serial-to-Parallel converter means SPU, Parallel memory PS, Internal | |
| Parallel memory IPS: | F 100 141 |
| Counter Z: | F 100 136 and F 100 136 |
| Delay means VZ: | F 100 102 |
| Comparison means VE, AND and OR logic gates: | PLA Circuit |

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An arrangement for deriving a byte clock from a serial, packet transmission-oriented data bit stream of a ring-shaped network suitable for light waveguide data transmission and for synchronization of a derived byte clock with an internal processing clock of a terminal equipment connected to the ring-shaped network, in which at least one filler information comprising the same binary information at all bit positions is inserted into the data stream between the data packets provided with a respective start data packet information and the conversion of the serial data stream into a byte sequence adapted to the internal processing rate occurs, said arrangement comprising:

a clocked series-to-parallel converter for receiving the serial bit stream and converting the same into parallel information, said series-to-parallel converter comprising a plurality of parallel outputs;

a parallel memory connected to said outputs of said series-to-parallel converter;

a comparator connected to said outputs of said series-to-parallel converter and including first and second outputs, said converter including means for stuffing filler information and start packet information for comparison with information at the output of said series-to-parallel converter;

said comparator including a first comparator element for comparing said filler information with the output of said series-to-parallel converter and providing an output signal upon identification of a bit information different from the filler information;

said comparator further comprising a second comparator element for comparing the output of the series-to-parallel converter with the start of packet information and operable upon the recognition of the start of packet information to form a transfer or reset information;

an AND gate connected to the output of said first comparator element and clocked by a byte clock to provide a holding information at a first of said outputs of said comparator, said signal from said second comparator element being provided to a second output of said comparator;

an OR gate connected to said second output of said comparator and clocked by a reset information;

a byte generating means clocked by the data bit clock and connected to said first output of said comparator and to said OR gate, said byte clock generating means including a counter connected to said first output of said comparator and to said OR gate and including a reset output connected to said OR gate, and a delay device connected to said counter, said delay device including an output providing said byte clock;

said parallel memory including a transfer input connected to and operable in response to the output of said OR gate; and an internal parallel memory connected to said parallel memory and including a processing clock input connected to said delay device to receive said byte clock and operable in response to a byte clock to receive information stored in said parallel memory.

2. The arrangement of claim 1, wherein:

said series-to-parallel converer comprises a plurality of registers corresponding in number to the plurality of bit positions of a data packet byte and, given the presence of an information corresponding to the filler information at the beginning of the start of packet information, said plurality of registers is increased by a plurality corresponding to the plurality of filler bits which are present up to the appearance of the first bit information different from the filler information.

3. The arrangement of claim 1, wherein:

said start of packet information and said filler information comprise a defined bit sequence which includes a byte length.

* * * * *